US011706164B2

(12) United States Patent
Mingels et al.

(10) Patent No.: US 11,706,164 B2
(45) Date of Patent: Jul. 18, 2023

(54) GRAPH-BASED NATURAL LANGUAGE GENERATION FOR CONVERSATIONAL SYSTEMS

(71) Applicant: Capital One Services, LLC, McLean, VA (US)

(72) Inventors: Diana Mingels, Orlando, FL (US); Amandeep Bakshi, Burtonsville, MD (US); Robert Cowell, Arlington, VA (US); Jeremy Doll, Horsham, PA (US); Jed Dunn, Sterling, VA (US); Mathias Menasi, Los Angeles, CA (US)

(73) Assignee: Capital One Services, LLC, McLean, VA (US)

( * ) Notice: Subject to any disclaimer, the term of this patent is extended or adjusted under 35 U.S.C. 154(b) by 177 days.

(21) Appl. No.: 17/315,726

(22) Filed: May 10, 2021

(65) Prior Publication Data

US 2022/0360544 A1 Nov. 10, 2022

(51) Int. Cl.

| | |
|---|---|
| ***H04L 51/02*** | (2022.01) |
| ***G06F 16/901*** | (2019.01) |
| ***G06F 40/20*** | (2020.01) |
| ***G06T 11/20*** | (2006.01) |

(52) U.S. Cl.

CPC .......... *H04L 51/02* (2013.01); *G06F 16/9024* (2019.01); *G06F 40/20* (2020.01); *G06T 11/206* (2013.01)

(58) Field of Classification Search

CPC ... H04L 51/02; G06F 16/9024; G06F 40/166; G06F 40/216; G06F 40/20; G06F 40/30; G06F 40/35; G06F 16/3329; G06T 11/206

See application file for complete search history.

(56) References Cited

U.S. PATENT DOCUMENTS

| | | | |
|---|---|---|---|
| 9,390,087 B1 | 7/2016 | Roux et al. | |
| 10,095,692 B2 | 10/2018 | Song et al. | |
| 10,438,119 B2 | 10/2019 | Buchanan et al. | |
| 2008/0209392 A1 | 8/2008 | Able et al. | |
| 2011/0016099 A1 | 1/2011 | Peer et al. | |
| 2013/0077771 A1 * | 3/2013 | Abella .................. | H04M 3/493 379/88.01 |

(Continued)

OTHER PUBLICATIONS

Jul. 20, 2022—(WO) International Search Report and Written Opinion—App No. PCT/US2022/072203.

(Continued)

*Primary Examiner* — Soe Hlaing
(74) *Attorney, Agent, or Firm* — Banner & Witcoff, Ltd.

(57) ABSTRACT

A computing device may represent dialog for output by a chatbot as a response graph. The graph may consist of nodes and edges, both of which may have attributes. The graph may be linked with another graph. There may be one or more traversal paths through the graph. The computing device may represent each traversal path as a row in a database table. Each column in the table row may correspond to: one or more nodes in the traversal path, a condition value, weight, and/or other filtering condition. A computing device may display a graphical user interface that allows a user to add, edit, and/or delete nodes and/or edges of the graph. The user interface may also allow the user to compare two or more graphs. The user interface may generate visualizations of traversal paths of a response graph.

20 Claims, 11 Drawing Sheets

100
Dialog Server 130
Response Editor 132
Natural Language Understanding Module (NLU) 134
Dialog Manager (DM) 136
Natural Language Generation (NLG) Module 138
Database 140
Network 150
110
120

(56) References Cited

U.S. PATENT DOCUMENTS

| | | | | |
|---|---|---|---|---|
| 2014/0250195 | A1* | 9/2014 | Capper | G06N 20/00 709/206 |
| 2018/0174020 | A1 | 6/2018 | Wu | |
| 2019/0034409 | A1 | 1/2019 | Curtis et al. | |
| 2019/0057157 | A1 | 2/2019 | Mandal et al. | |
| 2020/0105255 | A1 | 4/2020 | Huang et al. | |
| 2021/0027025 | A1 | 1/2021 | Olabiyi et al. | |
| 2021/0073474 | A1* | 3/2021 | Sengupta | H04L 51/02 |
| 2021/0312904 | A1 | 10/2021 | Shukla et al. | |
| 2022/0309059 | A1 | 9/2022 | Horvath et al. | |

OTHER PUBLICATIONS

Bouraoui, et al., "Graph2Bots, Unsupervised Assistance for Designing Chatbots", Proceedings of the 20th Annual Sigdial Meeting on Discourse and Dialogue, pp. 114-117, (Sep. 13, 2019).

Anonymous, "The Knowledge Graph", <https://web.archive.org/web/20210412164203/https://developer.kore.ai/docs/bots/bot-builder-tool/knowledge-task/creating-a-knowledge-graph/>, Jul. 12, 2022.

Bouraoui, et al., "Cluster-Based Graphs for Conceiving Dialog Systems", <http:ceur-ws.org/Vol-1880/paper2.pdf>, Jan. 1, 2017.

Morgan, "Conversational AI at Capital One", <https://www.forbes.com/sites/blakemorgan/2019/05/30/conversational-ai-at-capital-one/?sh=26c766ce620c>, Dec. 11, 2020.

Song, "Tackling Graphical NLP Problems with Graph Recurrent Networks", Department of Computer Science Arts, Sciences & Engineering, Edmund A. Hajim School of Engineering & Applied Sciences, University of Rochester, Rochester, New York, 2019.

Takase, et al., Neural Headline Generation on Abstract Meaning Representation, Proceedings of the 2016 Conference on Empirical Methods in Natural Language Processing, pp. 1054-1059, Austin, Texas, Nov. 1-5, 2016, ©2016 Association for Computational Linguistics.

* cited by examiner

100
Dialog Server 130
Response Editor
132
Natural Language
Understanding
Module (NLU)
134
Dialog Manager (DM)
136
Natural Language
Generation (NLG)
Module
138
Database
140
Network
150
110
120

300
START
302
?
status_code
304
NoError
?
result_size
306
>1
=1
GG
310
multiAccountsWithUs.gg
GG
308
singleAccountWithUs.gg
LS
312
LOOP_START
GG
314
accountTypeLastFour.gg
LE
316
LOOP_END
GG
318
getAccountSummary.gg
END
320
340
Graph Preview
Loops & Conditions
status_code:3
342
NoError
result_size: 2
344
>1

580
582
584
Traversal
status_code
result_size
302, 304, 306, 308, 312, 314, 316, 318, 320
NoError
1
302, 304, 306, 310, 312, 314, 316, 318, 320
NoError
>1
586
590
Traversal
Style
502, 508, 514, 518, 520, 522, 524
("I can't locate that account for you.")
Formal
•••
•••
502, 508, 514, 518, 522, 524
("I can't locate that account.")
Neutral
592
596

GRAPH-BASED NATURAL LANGUAGE GENERATION FOR CONVERSATIONAL SYSTEMS

TECHNICAL FIELD

The present disclosure is generally related to the generation of automated responses to user input.

BACKGROUND

Computer-based dialog systems may generate responses for users who are engaged in conversations with such systems. In such dialog systems, a user may provide input, such as text, or voice input, and the dialog system may generate a response, such as a statement or a prompt. However, computer-generated dialog output by such systems are often limited in diversity of responses, and those responses may lack variation. For example, computer-generated responses to user input in conventional systems may include limited numbers of response phrases such as "I don't know," "I'm sorry," and "I don't know what you are talking about."

Such dialog systems may be configured to execute a response "flow" that outputs a series of prompts and responses. In some examples, the responses for a given flow may generally relate to a particular topic. For example, a dialog system may be configured to execute a response flow related to checking a user's bank account balance. This flow may involve the dialog system prompting the user for credentials to authenticate the user, determining whether the supplied credentials authenticate the user, prompting the user for the account about which the user is inquiring, and responding to the user with the requested account balance, as some examples.

Dialog systems may be configured to generate and execute different kinds of flows in order to interact with users in a variety of different manners and for various purposes. Dialog systems and responses may be configured by developers. Such configuration may involve writing code in a programming language that defines responses.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding methods, apparatus, systems, and computer-readable media are also within the scope of the disclosure.

Systems described herein provide a computing device that allows non-technical users to generate responses for use in an automated response system. The computing device may cause a user interface to be displayed on a client device. Such a user interface may allow a user to graphically input responses to user and/or system-generated inquiries.

The user interface may allow non-technical users to design a series of responses using a graphical user interface (GUI), and may display the series of responses to the user in an easy-to-understand graphical format. The user interface may also allow these users to graphically visualize different responses that may be output.

A series of responses generated by a user with the GUI may be converted to, and stored in a database format. Storing these responses in a database may improve dialog system performance by allowing the system to use database queries to quickly access the responses. Being able to quickly access such responses may result in faster performance of dialog systems, and/or decreased resource utilization.

These features, along with many others, are discussed in greater detail below.

BRIEF DESCRIPTION OF THE DRAWINGS

The present disclosure is described by way of example and not limited in the accompanying figures in which like reference numerals indicate similar elements and in which.

DETAILED DESCRIPTION

Figure 1:
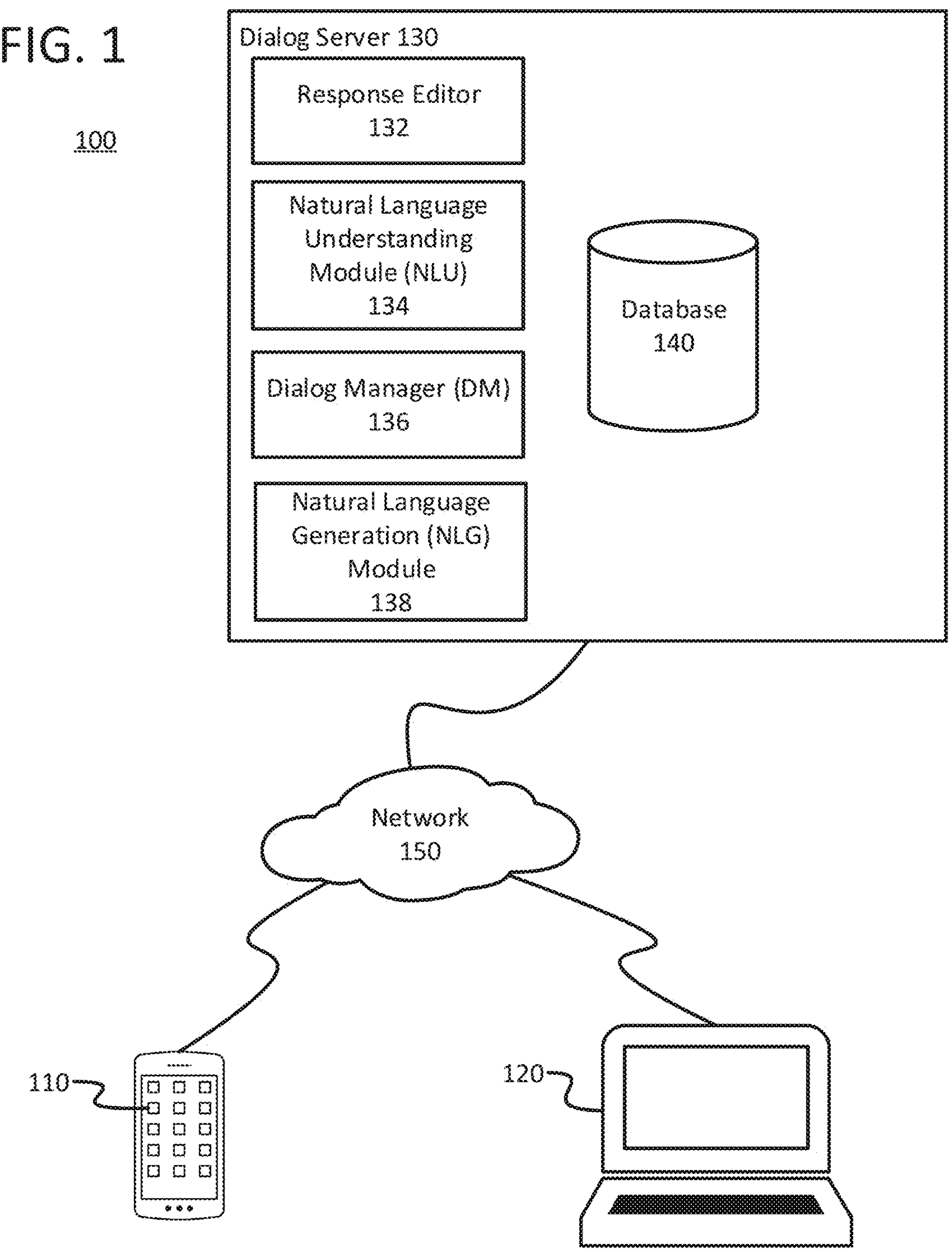
FIG. 1 shows an example of an operating environment in which one or more aspects described herein may be implemented.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for computer-based dialog systems. Such dialog systems may generate a response in the form of text-to-speech (TTS). Such responses may comprise prompts that are not generated based on receiving user input, and/or responses that are generated based on one or more user inputs. Such dialog systems may receive such user inputs from a user related to a plurality of tasks. Examples of such dialog systems may include automated voice response (AVR) systems that use voice recognition to interpret voice user input, or "chatbots," that may receive text-based inquiries, provide users with textual prompts, and/or receive textual user input responses to those prompts. Such systems may take various other forms as well.

Increasingly, such dialog systems are leveraging techniques, such as natural language processing (NLP), to automatically generate and output responses, including prompts and responses, without requiring administrators who configure such systems to manually enter the content of each response. While such dialog systems offer various advantages, such as automating the process of response creation, they may still suffer from various drawbacks as described herein.

For example, such dialog systems often produce repetitive responses that have very little variety. For instance, if a user provides an input that a dialog system fails to understand, the user may receive the same prompt over and over again, such as "I'm sorry, I didn't get that," without providing any variation to the user as a human normally would. Further still, dialog systems may have poor performance characteristics. For example, they may consume large amounts of processing power, have high output latency, execute algorithms that have high computational complexity, and the like.

Additionally, existing dialog systems may lack mechanisms by which non-programmer or non-technical administrators who create dialog for such systems can quickly, and without requiring code, create and edit dialog flows. Such systems may also lack the capability to generate comparisons of such response flows. The techniques of this disclosure solve the aforementioned problems associated with existing dialog systems.

As an example, aspects of this disclosure relate to representing a response graph. A response graph may take the form of one or more of: a content determination graph, a grammar graph, or a state management graph. Such a response graph may have a plurality of possible traversal paths, which may be represented as a database table. This database table may be further optimized to account for random response variations possible when traversing each graph. Specifically, each traversal path or permutation of a given response graph may be pre-computed, and represented as a separate row in the database table corresponding to that traversal path. At run-time, rather than traversing the nodes and edges representation comprising the nodes and edges of a particular graph traversal path, the dialog system may load the table row corresponding to the chosen variation path, rather than having to re-traverse the graph. Loading a table row rather than traversing a graph may reduce the amount of processing required to generate and output a response corresponding to the corresponding chosen path.

Embodiments described herein are also directed to user-friendly tools that may present users, such as administrators, with a graphical user interface (GUI)-based response editor that may allow the users to quickly view, generate, and/or edit response flows without having to use a programming language. Such editors may present response flows as response graphs comprising one or more nodes. Each node may represent a feature of the flow, such as a prompt, response, or decision. Each response graph may also present edges that connect the one or more nodes. The response editor may provide a simple drag-and-drop interface that allows users to quickly create and/or edit aspects of the response graph representation of the flow, such as the nodes and edges.

Additionally, such a response editor may improve response creation productivity and speed by allowing for components of one response flow to be reused in a different response flow. For example, the response editor may allow users to quickly identify one response flow and components thereof, and to reuse components of the identified response in another flow, thereby improving the productivity of users who are designing response flows via the response editor.

The response editor tools as described herein also allow administrators to configure and easily add response variations in a response flow. For example, using such an editor and in response to a given user input, the administrator may add a number of different possible response variations to a user's inquiry. With the response editor, the administrator may further configure the dialog system to randomly generate and output a response from the set of configured variations to the user.

However, with the addition of randomly traversing response nodes, the amount of variation that can be present in a given response graph may be difficult for a user (e.g., an administrator) to comprehend. Similarly, certain nodes within a response graph, referred to as "conditional nodes," may select a subsequent node for a traversal path based on the state of the dialog system, such as the value of a variable and/or a user input. Such conditional nodes may further add to the complexity and difficulty of understanding the possible path traversals and outputs of a given response graph. In order to aid the user in understanding the numerous possible variations of a response graph, the response editor may include the capability to generate a representation of each possible output of a response graph. The response editor may also include the capability to generate a "route overlay," which allows a user to traverse the nodes and edges of the response graph by setting application state, such as variable values associated with each conditional node, and/or by selecting edges that connect nodes. Such representation generation and route overlay capabilities may allow users who are designing response flow to more easily understand the outputs of a response graph.

In addition, current techniques for generating and editing response flows lack the capability to compare response flows to each other. The editor tools described herein may remedy this deficiency by generating a visual comparison of response flows. For example, the editor may compare two or more response flows that may be represented as graphs, and based on the comparison, determine differences between the graphs, such as whether any nodes or edges within the compared graphs have been added, edited, or deleted. The response editor may output the determined differences between the graphs.

The response editor, and in particular the graph comparison functionality, may also allow users to work on the same graph in parallel, which may increase the speed at which a response graph can be designed. For example, two users may design separate portions of the same response graph. Then, using the response editor, one user may compare and merge the two portions of the graph into the same graph.

The response editor tool described herein may also interface with dialog systems in a manner that may improve characteristics of a dialog system in various manners. For instance, at startup, a dialog system may be configured to load multiple editor-designed flows into an in-memory database in which each flow may be represented as a corresponding table of the in-memory database.

Operating Environments and Computing Devices

FIG. 1 shows an operating environment 100. The operating environment 100 may include at least user client device 110, client device 120, and dialog system 130, in communication via a network 150. It will be appreciated that the network connections shown in relation to network 150 are illustrative and any means of establishing a communications link between the computers may be used. The existence of any of various network protocols such as TCP/IP, Ethernet, FTP, HTTP and the like, and of various wireless communication technologies such as Bluetooth, GSM, CDMA, 3GPP protocols, WiFi, LTE, and/or 5G, is presumed, and the various computing devices described herein may be configured to communicate using any of these network protocols or technologies. Any of the devices and systems described herein may be implemented, in whole or in part, using one or more computing systems described with respect to FIG. 2.

Client devices 110, 120 may provide data to, and/or interact with the dialog systems described herein. Examples of client devices 110 and 120 may comprise computing devices, such as smartphones, tablets, laptops, wearable devices, or various other forms of computing devices as well. Access to dialog server 130 or resources thereof may be restricted to certain ones of client devices 110, such as client devices that provide certain credentials for authenticating users of those client devices.

Dialog server 130 may comprise one or more devices, which may include processors and/or memory, that may be configured to execute a variety of different applications and/or components of a dialog system. In some examples, such a dialog system may take the form of an audio-based system, such as an AVR phone tree, or a "chatbot" system that simulates normal human conversations with users. The dialog system may take various other forms as well.

Dialog server 130 may comprise components and/or associated applications such as response editor 132, natural language understanding (NLU) module 134, dialog manager (DM) 136, natural language generation (NLG) module 138, and/or database 140. One or more of dialog editor 132, NLU module 134, DM 136, NLG module 138, and/or database 140 may allow for the generation, output, and/or editing of response flows, and/or responses to user text and/or voice responses.

NLU module 134 may be configured to interpret and/or understand user input. NLU module 134 may use natural language understanding, machine learning, deep learning, and/or other computational techniques to attempt to interpret and/or understand user input. In some cases, NLU module 134 may provide understandings of user input to DM 136, that may use such understandings to maintain the state of the conversation.

DM 136 may be configured to determine and/or maintain a state of one or more conversations with one or more users. The state of a conversation may comprise variables or values, the state of function calls, a stack or heap, events, and/or other user interactions.

NLG module 138 may be configured to generate output in the form of responses, such as greetings, prompts, requests for information, alerts, notifications and/or responses to user input. NLG module 138 may use natural language generation, machine learning, deep learning, and/or other computational techniques to generate such output.

NLU module 134, DM 136, and NLG module 138 may form a chatbot that may be configured to receive user input and generate output in response. Such a chatbot may be configured using various machine learning techniques to generate response output based on a user's inquiry. The chatbot may be trained, for example using a machine learning technique such as a machine classifier, to determine associations between user input and one or more output responses, which may be stored in database 140. The chatbot may "learn" such associations, using any of various machine learning (ML) techniques, during a training phase. During the training phase, ground truth input and output data may be input to the chatbot (e.g., NLU module 134). Based on the inputted ground truth data, the chatbot may "learn" such associations between user input data and responses. Once the training phase is complete, the chatbot may be deployed. Once deployed, the chatbot may receive non-training user input data in the form of user-generated inquiries or inputs, and may determine, based on the associations that were learned during the training phase, responses to the user input. In some examples, the chatbot may be re-trained as additional user input is received in order to improve the accuracy of the chatbot.

Dialog server 130 may execute database 140, which may be an in-memory database that may offer faster database reads and writes as compared to databases that are not in-memory. Examples of such databases may include, but are not limited to: relational databases, hierarchical databases, distributed databases, in-memory databases, flat file databases, XML, databases, NoSQL databases, graph databases, and/or a combination thereof. Database 140 may be configured to store response flows in a database representation, such as rows and columns, as discussed in greater detail here.

Response editor 132 may execute on one or more computing devices and may be configured to allow users, such as administrators, to quickly visualize, generate, and/or edit response flows that are visualized as acyclic graphs or directed acyclic graphs (DAGs), comprising a set of nodes and edges. Response editor 132 may be a server-side application that interfaces with a client-side application. Additionally or alternatively, response editor 132 may be configured to provide a user interface on a client device that allows an administrator to edit one or more response flows (e.g., paths through the DAG). Response editor 132 may also provide administrators with the ability to add variation to response flows without requiring extensive computer programming or knowledge of a particular programming language. Still further, response editor 132 may compare existing response graphs to each other and, as a result of the comparison, generate visual representations of the differences.

After a response graph is created or edited, response editor 132, or another component of the dialog system, may generate a corresponding output payload corresponding to that flow and/or response graph (e.g., acyclic graph, DAG). The dialog system (e.g., NLG module 138) may receive one or more payloads for each response graph and generate one or more traversal paths through each identified response graph. The one or more traversal paths may then be stored in memory, such as database 140. In some examples, each response graph may be stored as a separate table in database 140. Each row of a table may correspond to a different traversal path through the response graph (e.g., acyclic graph, DAG). One or more columns within a row may correspond to a node or nodes within the traversal path. Examples such tables are discussed in greater detail herein, and with respect to FIG. 5C.

NLG module 138 may perform database queries, such as SQL queries, to quickly identify a given response graph table, a given traversal path, a node within a traversal path, and/or associations between a graph table, traversal path, or node. NLG module 138 may perform database queries that may take other forms as well.

Various computing devices are described as performing functions described in the context of operating environment 100. However, it should be noted that any computing device or combination of computing devices in the operating environment 100 may perform any of the processes and/or store any data as described herein The data transferred to and from various computing devices in operating environment 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. A file-based integration scheme or a service-based integration scheme may be utilized for transmitting data between the various computing devices. Data may be transmitted using various network communication protocols. Secure data transmission protocols and/or encryption may be used in data transfers to protect the integrity of the data such as, but not limited to, Secure File Transfer Protocol (SFTP), and/or Pretty Good Privacy (PGP) encryption. In many embodiments, one or more web services may be implemented within the various computing devices of operating environment 100. Web services may be accessed by authorized external devices and users to support input, extraction, and manipulation of data between the various computing devices in the operating environment 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. Secure network appliances may include built-in features such as hardware-accelerated SSL and HTTPS, WS-Security, and/or firewalls. Such specialized hardware may be installed and configured in the operating environment 100 in front of one or more computing devices such that any external devices may communicate directly with the specialized hardware.

Figure 2:
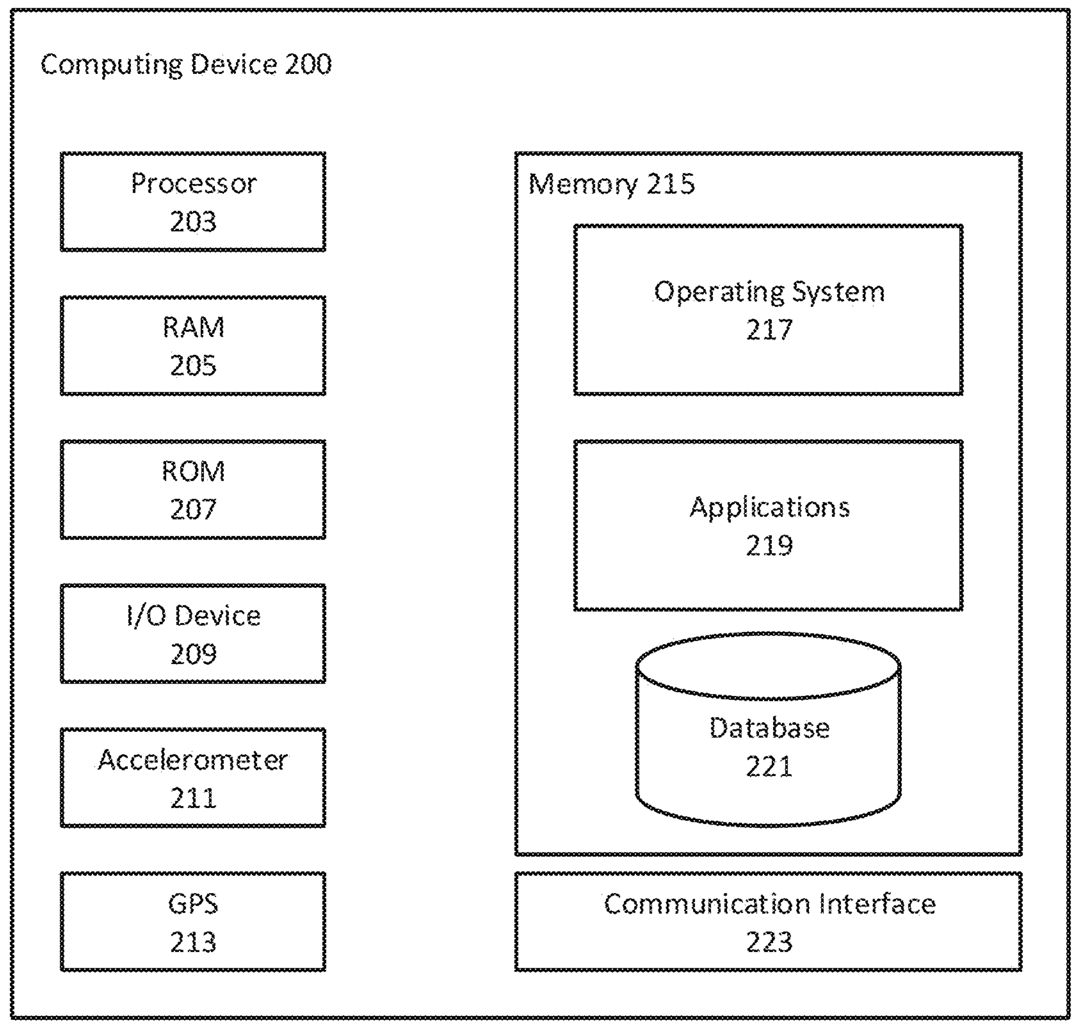
FIG. 2 shows an example computing device in accordance with one or more aspects described herein.

Turning now to FIG. 2, a conceptual illustration of a computing device 200 that may be used to perform any of the techniques as described herein is shown. The computing device 200 may include a processor 203 for controlling overall operation of the computing device 200 and its associated components, including RAM 205, ROM 207, input/output device 209, communication interface 211, and/or memory 215. A data bus may interconnect processor(s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Software may be stored within memory 215 to provide instructions to processor 203 allowing computing device 200 to perform various actions. Memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Communication interface 223 may include one or more transceivers, digital signal processors, and/or additional circuitry and software for communicating via any network, wired or wireless, using any protocol as described herein. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, LTE, and 5G is presumed, and the various computing devices described herein may be configured to communicate using any of these network protocols or technologies.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches including, but not limited to, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Response Editor Flows

Figure 3A:
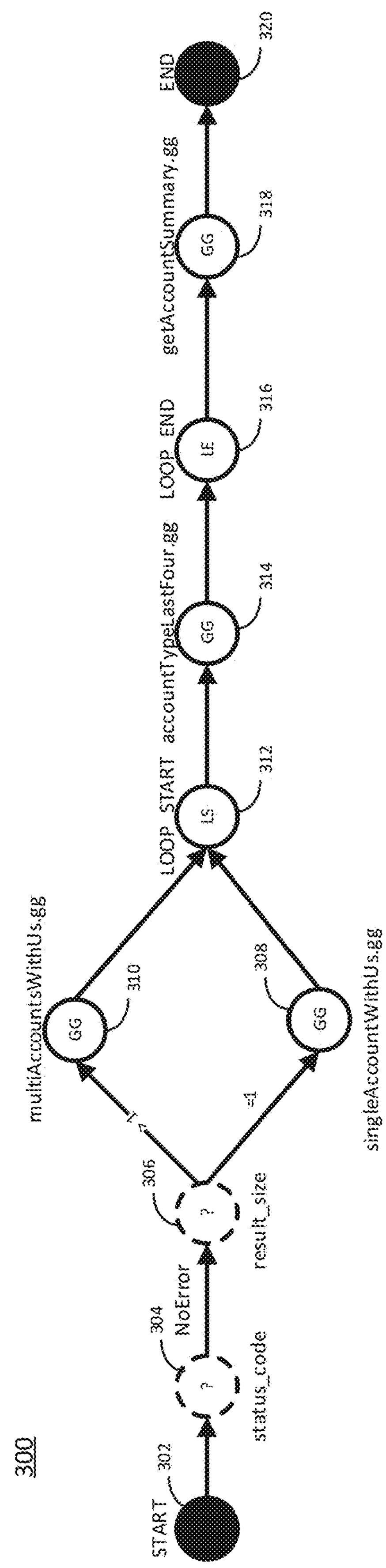
FIG. 3A shows an example of a content determination graph in accordance with one or more aspects described herein.

As described above, a graphical user interface may be provided that allows a non-technical administrator to generate responses for a chatbot. FIG. 3A shows an example of a graphical representation of an example flow that may be displayed by a response editor, such as response editor 132. The flow may be presented to a user, such as an administrator, as response graph 300, which in this example may be a CDG. Such a response graph comprises nodes, which are represented as circles, and edges that may be represented as lines with an arrowhead at one end. Each edge may unidirectionally connect two nodes. The nodes and edges can be traversed in the direction of the arrow to form a traversal path through the graph. Such a graph that has unidirectional edges that connect the nodes, and does not have loops (e.g., is acyclic), may be referred to as a directed acyclic graph (DAG).

In the example flows described herein, including FIG. 3A, there may be multiple different types of nodes within a flow. "START" and "END" nodes (302, 320), which indicate the start and end of each flow, may be indicated by nodes having solid fills. Conditional nodes may be indicated with dashed outlines. The conditional nodes may also include a question mark ("?") in the middle of the node. A conditional node may cause the dialog system to make a determination based on received user input and/or a state of a conversation/dialog. The determination based on the received user input and/or the state of the conversation may comprise selecting and traversing to a subsequent node in the flow. Grammar graph ("GG") nodes may be indicated with the letters "GG." GG nodes may represent another associated graph that is to be traversed. Such grammar graphs may comprise one or more word nodes, variable nodes, etc., that are to be output. A grammar graph may also indicate variation (e.g., traversal variations) among its constituent nodes. Loop nodes may comprise a "LOOP_START" node that indicates the start of an iterative loop and a "LOOP_END" node, which may indicate the end of an iterative loop. Loop nodes may be indicated with the acronyms "LS" and "LE," respectively.

In the example shown in FIG. 3A, graph 300 may correspond to a flow performed by a chatbot that interacts with a user to report balance(s) of a user's financial accounts. The traversal of response graph 300 may differ based on whether the user has multiple financial accounts or a single account.

In the example of FIG. 3A, traversal of graph 300 may begin with NLG module 138 at a start node, such as start node 302 in the example of FIG. 3. From start node 302, the NLG module 138 may traverse an edge to conditional node 304. Conditional node 304 may determine a state of the conversation/dialog. As shown in FIG. 3A, conditional node 304 may determine whether an error has occurred. For example, conditional node 304 may comprise a "status_code" variable. If "status_code" is not equal to "NoError," NLG module 138 may determine that an error occurred and terminate flow 300. However, if the "status_code" variable is equal to a value of "NoError," then NLG module 138 may determine that there was not an error and the flow may proceed to node 306. In conditional node 306, the computing device (e.g., NLG module 138 executing on the computing device) may determine whether the user has one or more accounts. As shown in FIG. 3A, the conditional node 306 may determine whether the variable "result_size," which corresponds to a number of accounts the user has, is equal to or greater than one.

If NLG module 138 determines that the number of the user's accounts is greater than one, NLG module 138 may traverse to GG node 310, which may load the grammar graph named "multiAccountsWithUs.gg" that is responsible for generating a response for a user having multiple accounts. In this regard GG node 310 may prompt the user to specify which one of the one or more accounts they are requesting information about. Otherwise, if NLG module 138 determines that the user has a single account, NLG module 138 may traverse to the GG node 308, "singleAccountWithUs.gg," which may load a graph that is responsible for generating output (e.g., a response) for users having a single account.

After completing the processing for users with one account and/or users with multiple accounts, NLG module 138 may proceed to LOOP_START node 312, then to GG node 314. GG node 314 may output the last four digits of each account type. For example, GG node 314 may cause a chatbot to output a response such as "Venture account ending in 1234," "Quicksilver card with the last four digits of 5678", and/or "Savings account ending in 9090," as just some non-limiting examples. After visiting node 314, NLG Module 138 may visit LOOP_END node 316. NLG module 138 repeatedly loops through and outputs the type and the last four digits of each user account until information for all the user's accounts has been output.

After user account information has been outputted, NLG module 138 may traverse to GG node 318, corresponding to the grammar graph "getAccountSummary.gg," may output a prompt that may trigger a summary of user's accounts. For example, GG node 318 may output a response, such as "text '$' to 90113 to get your account summary," or "text '$' to 90113 to obtain your latest account information," as some non-limiting examples. Finally, after outputting a prompt for the account summary, NLG module 138 may traverse to end node 320, which completes flow 300.

In some examples, based on the state of a dialog, NLG module 138 may determine that an additional response, in the form of a state management graph (SMG), should be prepended or appended to a given response flow. Some examples of SMGs may comprise greetings (e.g., "hello," "good morning,") acknowledgements (e.g., "thank you," "you are welcome," "sure"), etc. Accordingly, such SMGs may serve to make dialog with a user seem more fluid. Such SMGs may be prepended or appended to a given response regardless of the intent of a given response that is being or is to be output.

A computing device (e.g., response editor 132 executing on the computing device) may allow administrators to edit flows, such as flow 300 in various manners. Functionally, the appearance of response editor 132 may be "drag-and-drop" in which a user can quickly select nodes to add or delete, and changes made to flow 300 may be reflected graphically in real-time. For instance, an administrator may use response editor 132 to add, edit, or remove nodes. In an example, via response editor 132, an administrator could remove node 318. As another example, the "getAccountSummary.gg" GG node associated with node 318 could be changed to refer to a graph other than "getAccountSummary.gg." According to some examples, the variables "status_code" or "result_size"

corresponding to conditional nodes 304 and 306, could be changed to different corresponding variables.

Response editor 132 may also allow administrators to graphically add, remove, and/or edit edges between the nodes. For example, response editor 132 could be used to add an edge between nodes 308 and 318, or to remove one or more edges. Further, the conditions associated with an edge, such as ">1" associated with the edge connecting nodes 306 and 310 could be changed to ">2" or ">3". Response editor 132 may allow an administrator to make various other edits to the nodes and edges of a response flow as well.

Graph 300 may comprise a content determination graph (CDG). A CDG may represent an overall structure of a response to a given request. Graph 300 may also comprise one or more nodes that are associated with grammar graphs, which are discussed in greater detail herein.

Figure 3B:
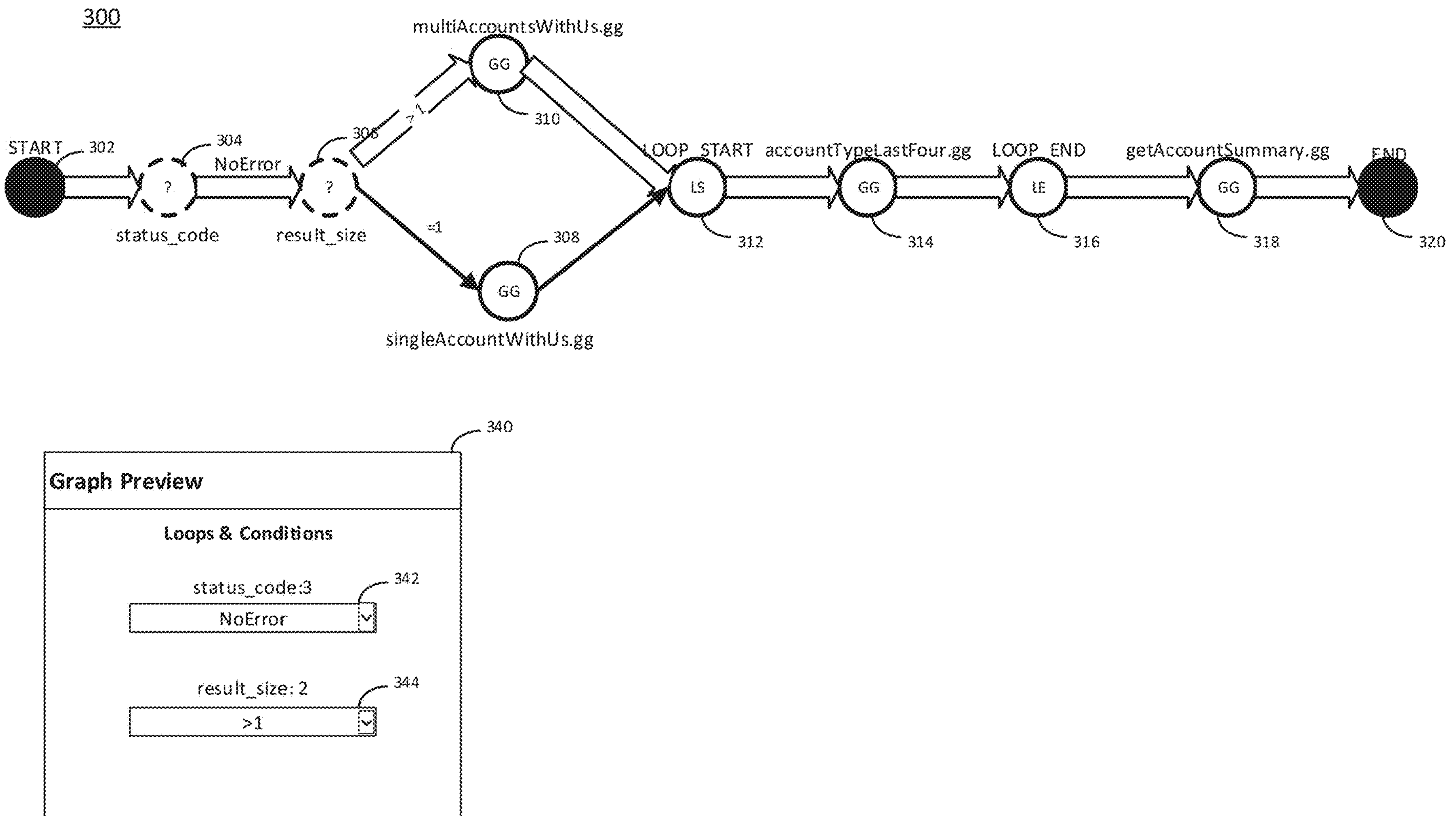
FIG. 3B shows an example of a content determination graph route overlay in accordance with one or more aspects described herein.

Turning now to FIG. 3B, FIG. 3B shows an example of a route overlay. As discussed herein, flow graphs may have numerous possible traversal paths. The traversal path that is chosen may depend on the current state of the flow, such as the values of variables, user input, etc. As a result of these numerous possible paths, it may be difficult for a user creating or editing a response flow to determine what conditions need to be met to traverse down a particular path, or to determine the traversal path that results from a particular state or set of conditions.

To better help such a user understand the set of conditions that results in a particular traversal path, response editor 132 may include a "route overlay" feature, as shown in the example of FIG. 3B. The route overlay feature may partially and/or fully expand GG nodes of response graphs to show the underlying graphical structure of those GG nodes. To utilize the route overlay feature, a user of response editor 132 may be presented with a dialog box similar to dialog 340, which allows the user to select nodes, edges, and/or values of conditions associated with one or more nodes along a traversal path of a response graph, such as response graph 300. Then, based on the selected values, response editor 132 may overlay a second, emphasized graph corresponding to the traversal path that would result from those variable selections. Additionally or alternatively, response editor 132 may highlight the nodes and/or edges of a path, for example, using a different color.

In the example of FIG. 3B, for instance, response editor 132 may receive a user input that enables or selects a route overlay feature. With response editor 132, a user may select a value for the "status_code" variable associated with conditional node 304 from dropdown 342. In this example, the user has indicated that the "status_code" variable is equal to a value of "NoError," which may be a constant value, as an example. Based on selecting the "NoError" value, response editor 132 may output an overlay arrow that emphasizes the edge between nodes 304 and 306 in order to indicate that the "status_code" variable being equal to a value of "NoError" would result in proceeding from node 304 to node 306.

Additionally or alternatively, the user may be presented with dropdown 344, from which a user may select the value of "result_size." Dropdown 344 may include options ">1" and "=1" from which the user may select. In this example, the user selects ">1," and based on the selection, response editor 132 may output an overlay that emphasizes the edge that connects node 306 and node 310. The user may continue the process of selecting conditions for each node to generate an overlay that spans a particular path of response graph 300 that results from the conditions specified in dialog 340. In this manner, the route overlay function may in effect generate a second graph that is overlaid atop a first response graph, such as graph 300, and which emphasizes a particular traversal path through a response graph based on a specified set of conditions. In the example shown in FIG. 3B, the route overlay may cover a traversal path that begins with START node 302 and ends at END node 320. In various examples, the route overlay may cover a subset of all nodes and edges within a response graph. For instance, a route overlay may cover the traversal path defined by nodes 306, 310, 312, and 314.

Figure 4A:
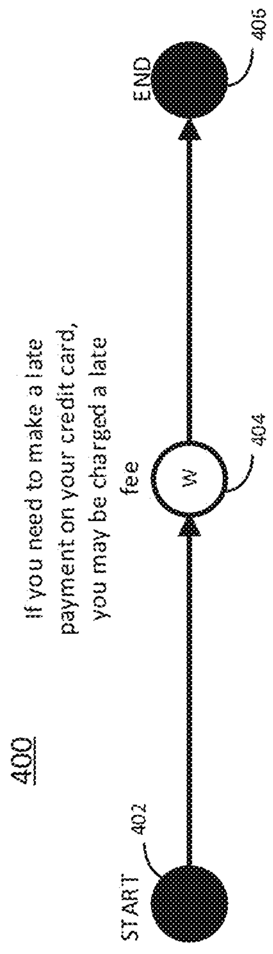
FIG. 4A shows an example of a grammar graph in accordance with one or more aspects described herein.
Figure 4B:
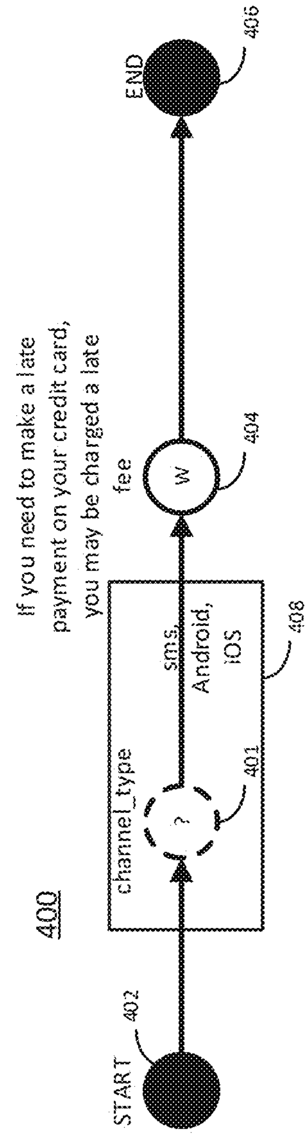
FIG. 4B shows an example of a grammar graph in accordance with one or more aspects described herein.

In addition to providing the capability to create and edit graph representations of response flows, response editor 132 may provide other capabilities related to versioning and comparison of such graphs, as shown and discussed in greater detail with respect to FIGS. 4A and 4B. Turning to FIG. 4A, a grammar graph 400 that may be associated with a response flow for making a late credit card payment is illustrated. In some examples, grammar graph 400 may comprise one more additional grammar graphs, which may be associated with GG nodes of such a grammar graph. Grammar graph 400 begins with "START" node 402, and then proceeds to word node 404. Word nodes may be indicated with a letter "W." A word node may comprise one or more words. In the example of FIG. 4A, word node 404 has the associated output response, "If you need to make a late payment on your credit card, you may be charged a late fee." After visiting word node 404, grammar graph 400 proceeds to END node 406 via an edge.

As noted previously, an administrator may use response editor 132 to add one or more nodes to a response graph, such as grammar graph 400. For example, as shown in FIG. 4B, an administrator may add a conditional node 401 to grammar graph 400 and an additional edge. The conditional node may determine the value of the "channel type" variable which may indicate the platform (e.g., mobile, desktop, SMS, android, iOS, etc.) that the user is currently using to communicate with the dialog system. The newly-added edge may specify that only mobile clients, such as SMS-capable devices, Android devices, and/or iOS devices, should receive the response output of node 404.

An administrator may utilize response editor 132 to compare differences between the nodes and edges of the two different versions or portions of grammar graph 400 illustrated in FIGS. 4A and 4B. As a result of the comparison, differences between the nodes and edges may be shown, for example by callout box 408, with highlighting, and/or other in various other manners. While FIG. 4B shows the examples via callout box 408, it will be appreciated that any changes between a first graph and a second graph, such as the addition of node 401 and the newly-added edge, may be shown via highlighting, bolding, call outs, or any other type of indication or emphasis.

To determine the differences between the two response graph versions, response editor 132 may first determine universally unique identifiers (UUIDs) associated with each node and iteratively compare the UUIDs of all nodes in the two graphs against each other. If a node has been added to a graph, that node's UUID will not be present in a previous version of the graph. Similarly, if a node has been deleted, the UUID of that node will not be present in the revised version of the graph. The same process can be repeated for the UUIDs of each edge to determine if any edges have been added or removed. In addition to comparing UUIDs of nodes and edges, the computing device (e.g., response editor 132 editor executing on a computing device) may also determine differences between two or more response graphs by comparing the attributes of the graph nodes, such as text, conditionals, probability weights, styles, etc., to each other. If the corresponding attributes of nodes and/or edges differ, response editor 132 may also determine that there is a difference between the response graphs, and may indicate the difference.

Figure 5A:
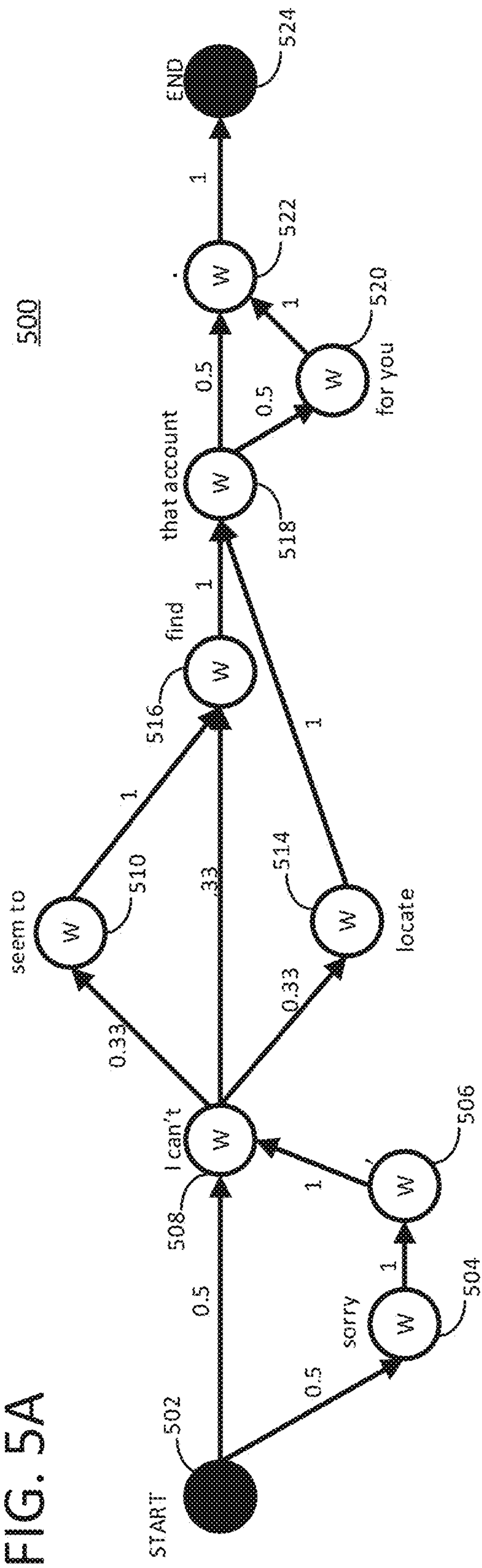
FIG. 5A shows an example of a grammar graph in accordance with one or more aspects of the disclosure.

As discussed above in the context of FIG. 3A, a flow may include GG nodes. Such GG nodes may comprise or may be associated with another graph or sub-graph. In some examples, a GG may comprise one or more word nodes, variable nodes, other GG nodes, and/or conditional nodes. An example graph flow of a GG node is shown in response graph 500 FIG. 5A. Turning now to FIG. 5A, response graph 500 is an example of a "grammar graph" corresponding to a GG node, such as one of the GG nodes shown in FIG. 3. Such a GG may comprise word nodes, and/or variations associated with those word nodes. Such a GG may also be reusable. That is, a GG may be included in one or more other GGs and/or CDGs, such as the CDG illustrated in FIG. 3A. Graph 500 begins with "START" node 502. Graph 500 also comprises a number of word nodes that are indicated with a "W." Each word node may correspond to an output of one or more words or characters, which may include punctuation, that NLG module 138 may use to generate an output response based on traversing that node. Additionally, each edge in response graph 500 is associated with a probability of traversing that edge to the next node. Adding probabilistic weights to each edge may allow the dialog system to vary the response that is output for a given response flow.

Although not shown in FIG. 5A, graph 500 may comprise one or more variable nodes. Such a variable node may represent a placeholder for a value that NLG module 138 may dynamically inject (e.g., insert) into a response flow at runtime. Variable values returned from an API may be just some examples of such dynamically injected values. For instance, a GG may cause NLG module 138 to generate the text, "Your balance is {amount}," where the text "Your balance is" may be represented by one or more word nodes, and "{amount}" may correspond to a variable node that represents a user's account balance, the value of which NLG module 138 may inject at runtime based on querying an API.

According to some further examples, one or more nodes of response graph 500 may be associated with one or more attributes, which may include (but may not be limited to): UUIDs, padding (e.g., a new line character, space character, tab character, etc.) that may be applied to the left and/or right of a given word node, capitalization changes (e.g., upper and/or lower-casing of the text from a previous and/or subsequent word node), mark-up, emotion labels, and/or style for the text of a node, etc.

For the purpose of example, a traversal path through graph 500 is described. However, it should be understood that NLG module 138 may not perform such a traversal at runtime, and instead may query a database table to determine a response corresponding to a traversal path. Such a database query is described in greater detail with respect to FIGS. 5B and 5C. According to such a traversal example (which may be implemented at runtime as data returned from a database query), NLG module 138 may begin traversing a path through response graph 500 at START node 502. Nodes 508 and 504 have equal weight (0.5), so NLG module 138 may select node 504 ("sorry") and then traverse to node 506, which outputs a comma (",") and then to node 508, which outputs "I can't."

As an example, NLG module 138 may begin traversing a path through response graph 500 at START node 502. The edges emanating from node 502 to nodes 508 and 504 have equal weight (0.5), so NLG module 138 may select node 504 ("sorry") and then traverse to node 506, which outputs a comma (",") and then to node 508, which outputs "I can't." Alternatively, NLG module 138 may traverse from START node 502 to response node 508, which outputs "I can't," and may skip the output response associated with nodes 504 and 506. From node 508, NLG module 138 may traverse to either node 510, 514, or 516, and output the corresponding response. If NLG module 138 traverses to node 510, it then traverses to nodes 516 and 518, and outputs the response "seem to find that account." If NLG module 138 traverses instead to node 516, it then traverses to node 518 and outputs the response "find that account." Or, if NLG module 138 instead traverses to node 514, it then traverses to node 518 and outputs the response "locate that account." From node 518, NLG module 138 has equal probability of traversing to node 522 and outputting a period (".") or to visit node 520 followed by node 522, and outputting "for you." In some examples, node 522, which may output a period, may comprise or may be associated with a style attribute, such as left padding attribute, which may indicate that there should not be any white space before node 522, regardless of the traversal path that was taken to arrive at that node. In some examples, the last word node of a response flow (node 522 in the example of FIG. 5A) may comprise an attribute indicating that any text following the period (".") should always be capitalized.

As described with respect to FIG. 5A, by adding weights to the edges of a node, a user of response editor 132 can add numerous possible response output variations as described above. Such variations may improve a user's conversation experience, e.g. with a chatbot, by making such conversation responses more varied, and therefore more natural, and less repetitive to users that have conversations with the dialog system.

Figure 5B:
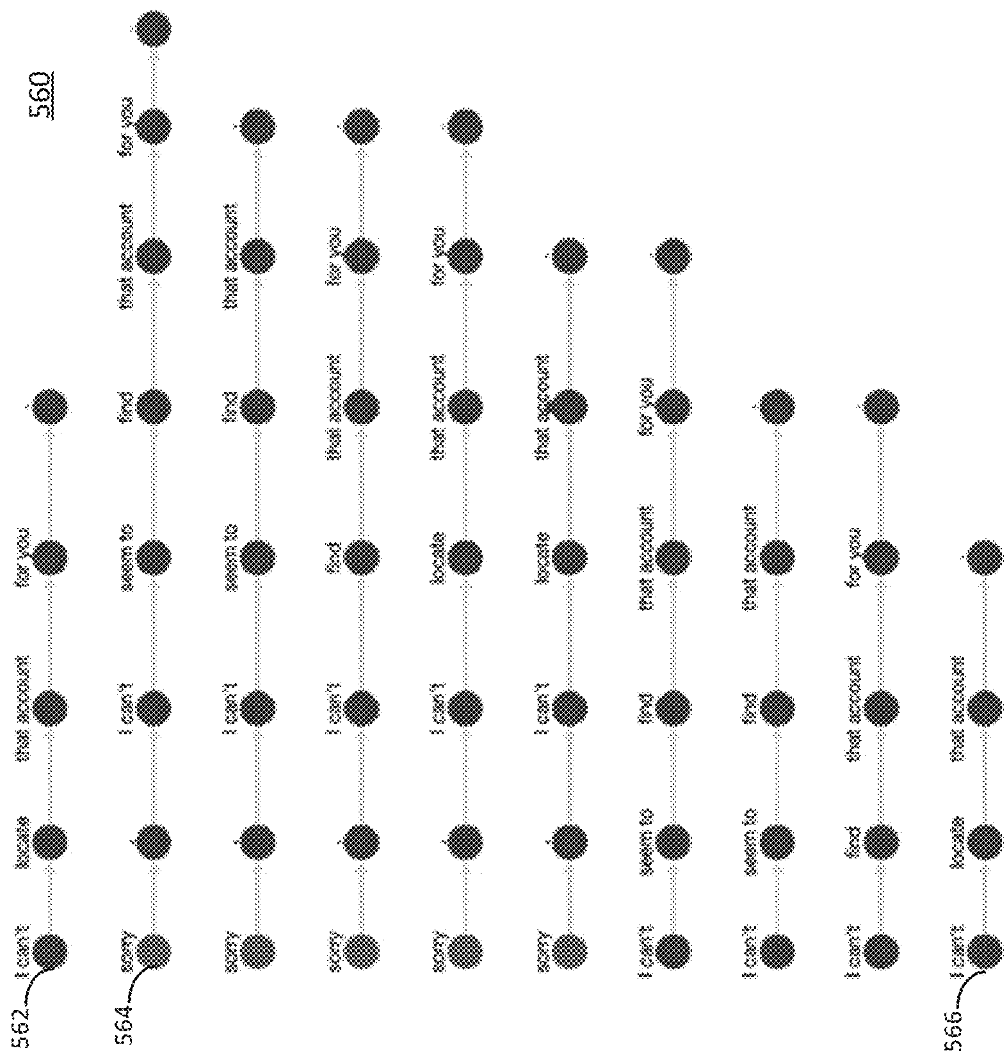
FIG. 5B shows examples of path traversals through a grammar graph in accordance with one or more aspects of this disclosure.

Turning now to FIG. 5B, FIG. 5B illustrates representations 560 for each possible traversal path through response graph 500 of FIG. 5A. Generating an output of each possible traversal path may allow a user of response editor 132 to better understand all the possible outputs, such as outputs generated by word nodes, that may be output from all the traversals of a given response graph, which may be due to the large amounts of variation that may be introduced as a result of random edge weights and/or the different paths that may result from conditional nodes. Representations 560 may also be considered a form of route overlay insofar as they emphasize various traversal paths.

Additionally, generating each possible traversal path through a given response graph (e.g., a CDG, GG, and/or SMG) may provide performance benefits, as described herein. At initialization time of the dialog system, NLG module 138 may identify all response graphs that may be utilized at run-time. For each identified response graph, NLG module 138 may determine a representation of all possible traversal paths through that graph, such as representation 560 shown in FIG. 5B. For each identified response graph, NLG module 138 may create a corresponding table in an in-memory database, such as database 140.

Within a given corresponding response graph table, NLG module 138 may represent each traversal path for that graph as a row in that table. Each traversal path of the corresponding graph may be stored in one or more database columns of the table. In the example of FIG. 5B, the first traversal path 562 that outputs the text, "I can't locate that account for you," may be represented as a first row in the table. One or more columns within the first row may represent an associated response from that first traversal path 562. Similarly, traversal path 564 may be represented as a second row in the table, and one or more nodes in the second row may represent a response that is associated with second traversal path 564. Traversal path 566 may also be represented as another row in the table, and one or more nodes of traversal path 566 may represent a response associated with that row.

Representing the traversal paths of a graph in the form of a database table provides a number of advantages. As an example, by using a database table representation, the dialog system need not maintain and traverse a graph data structure. Instead, the dialog system may simply query the database for the table corresponding to a response graph to be traversed, and query the table to access the set of nodes for a particular traversal path. Such a query may indicate one or more filtering conditions, which may be used to select a row corresponding to a particular traversal path.

Also, if a response graph has edges that are probabilistically weighted, such as may be the case with a GG, the components of the dialog system can randomly sample from the database table for that graph or in accordance with the weighted distributions to quickly obtain a database row corresponding to a traversal path through the graph, rather than having to traverse the nodes of a graph data structure. As another advantage, a node, such as a GG node, of a first graph may be related to another response graph. By storing node relationship information, such as a graph that is related to a GG node, in a database, the related graph may quickly be identified by performing a database query, such as a "join" query, rather than by having to maintain mappings between a GG and a related graph.

Figure 5C:
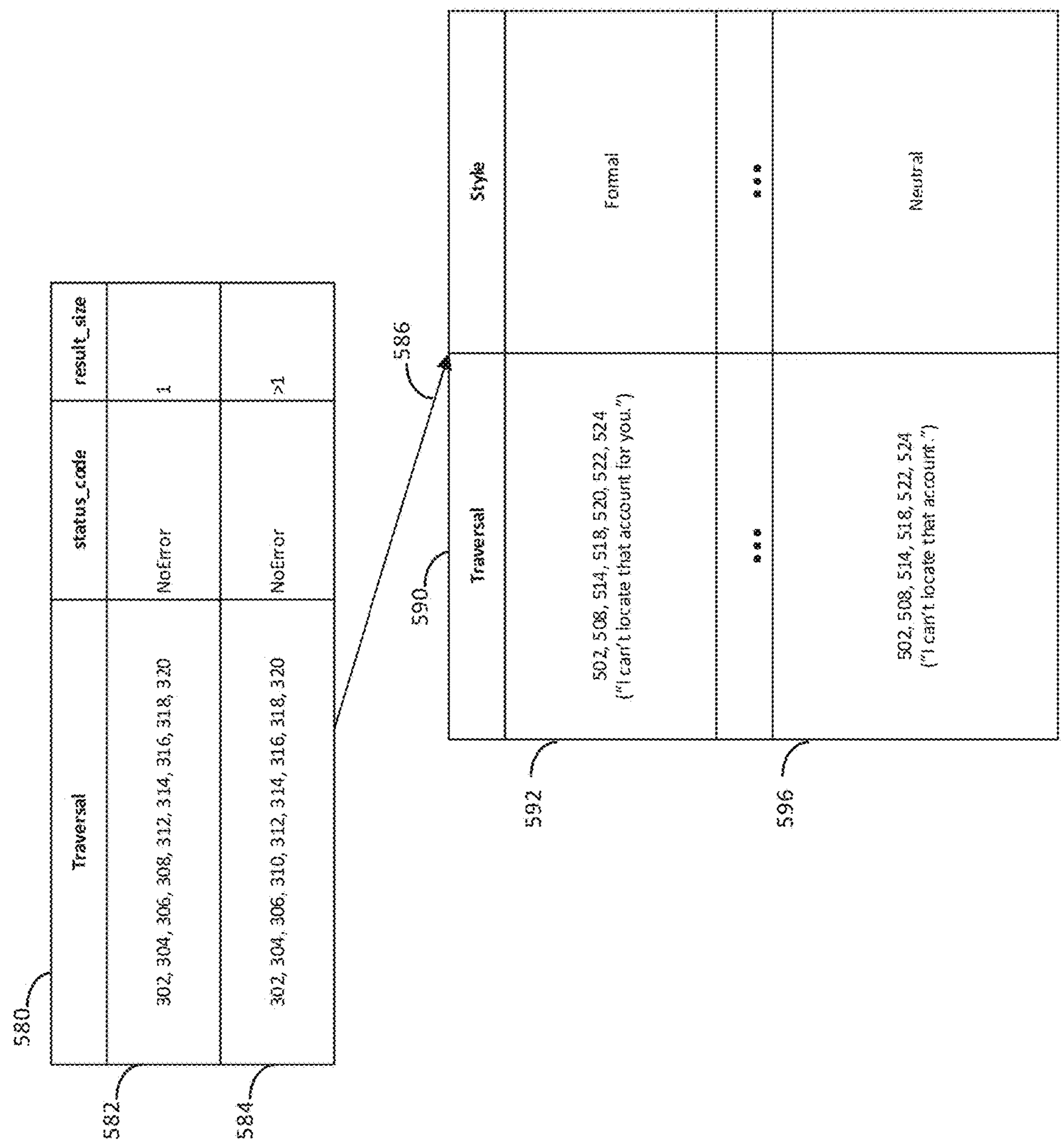
FIG. 5C shows examples of database table representations of a response graph in accordance with this disclosure.

As discussed above, response graphs and traversals thereof may be represented as a database table format. Turning now to FIG. 5C, examples of such database table formats are illustrated. FIG. 5C shows a first database table 580 and a second database table 590. According to the example of FIG. 5C, first database table 590 may correspond to, or be associated with, a CDG, such as graph 300 shown in FIG. 3A. Table 590 may correspond to, or may be associated with, a GG, such as GG 500 shown in FIG. 5A.

In the example of FIG. 5C, table 580 has three columns named: "Traversal," "status_code," and "result_size," respectively. The traversal column may indicate one or more traversal paths through the corresponding graph, such as graph 300 in this example. The traversal column may generally indicate one or more nodes that comprise a traversal path. Such nodes may be indicated by their associated UUID values, as an example. Additionally, each node may have one or more associated attributes, which may also be stored in the traversal column or another column. As some examples, such attributes may comprise node types, weights, textual styles, words/text, loops, associated graphs (e.g., GGs), etc. Such attributes may take any of various formats. Examples of such formats may include comma-separated values (CSV), JavaScript Object Notation (JSON), an XML-based markup format, etc.

The columns other than the traversal column, such as the "status_code" and "result_size" columns of first table 580, may indicate filtering conditions that may be associated with one or more traversal paths of a given graph. NLG module 138 may use such filtering conditions to select the most appropriate response for a given traversal path. In the example of FIG. 5C, the status_code column may indicate the value of a variable named status_code, and the result_size column may indicate the value of the result_size variable that may be associated with each traversal path.

Turning now to row 582, the traversal column of row 582 includes identifiers of each node in a corresponding traversal path of graph 300. For row 582, the traversal column may include identifiers of nodes 302, 304, 306, 308, 312, 314, 316, 318, and 320. For this traversal path to be taken, the value of status_code is equal to the value NoError, and the variable result_size is equal to one.

Row 584 may correspond to a second traversal path of graph 300. For row 584, the traversal column may include identifiers of nodes 302, 304, 306, 310, 312, 314, 316, 318, and 320 that comprise a second traversal path that is different from the traversal path described by row 582. For the traversal path indicated by the traversal column of row 584 to be taken, the value of status_code is equal to the value NoError, and the variable result_size is greater than one.

In an example, NLG module 138 may determine that a response flow from graph 300 is to be outputted. To output such a response flow, NLG module 138 may determine a state of a dialog at runtime. Determining this dialog state may involve determining states of the variables status_code and result_size. Based on the determined state, NLG module 138 may query table 580 to determine a traversal path. The query used to determine the traversal path may indicate the determined values of status_code and result_size. If, for instance, status_code is equal to NoError and result_size is equal to one, the query may return row 582, and NLG module 138 may output a response associated with the nodes in the traversal column of row 582. As another example, if status_code is equal to NoError and result_size is greater than one, the query may return row 584, and NLG module 138 may output a response associated with the nodes in the traversal column of row 584.

As discussed above with respect to table 580, an attribute corresponding to a given node may indicate that the corresponding node is associated with another graph. For instance, in table 580, node 308 may be associated with the GG node titled "singleAccountWithUs.gg." GG node 308 may be represented by table 590, which may correspond to a graph, such as graph 500 shown in FIG. 5C. Such a relationship between node 308 and table 580 is indicated by arrow 586 in the example shown in FIG. 5C.

As explained above, such a GG may have a number of different traversal paths. Such traversal paths may be defined at least in part by traversal weights that may be associated with edges of the GG. In this example, graph 590, like graph 580, may have a "Traversal" column that may indicate a sequence of nodes that comprise that traversal path, and a "Style" column that may indicate a style associated with the text that would be output by those nodes. As discussed with respect to FIG. 5B, graph 500 may have a variety of traversal paths, such as traversal paths 562, 564, 566, etc. Each traversal path of graph 500 may be represented by a corresponding row of database table 590. For example, row 592 may correspond to traversal path 562, and row 596 may correspond to traversal path 566 shown in FIG. 5B.

The traversal column of row 592 may indicate a sequence of nodes that comprise the corresponding traversal path. The sequence of nodes may comprise nodes 502, 508, 514, 518, 520, 522, and 524 of graph 500 that is shown in FIG. 5A. Each node in the traversal column of row 592 may be associated with one or more attributes. Such attributes may indicate that node 502 is a start node, nodes 508, 514, 518, 520, and 522 are word nodes, and node 524 is an end node. Such attributes may additionally or alternatively indicate text associated with such word nodes. For instance, the attributes of row 592 may indicate that node 508 is associated with "I can't," node 514 is associated with "locate," node 518 is associated with "that account," node 520 is associated with "for you," and node 522 is associated with a period ("."). The attributes of row 592 may also indicate other attributes that may affect output generated by NLG module 138. For instance, an attribute of word node 506 may indicate that NLG module 138 is to insert a pause (e.g., a delay) before outputting subsequent text. An attribute of node 522 may indicate that any subsequent text output by NLG module 138 should be capitalized. The style column of row 592 may indicate that the output generated by the nodes of row 592 is associated with a formal dialog style.

Row 596 may correspond to traversal path 566 of FIG. 5B. The traversal column of row 596 may indicate a sequence of nodes in the traversal. In this example, the sequence may comprise nodes 502, 508, 514, 518, 522, and 524. The attributes associated with those nodes may indicate that node 502 is a start node, that nodes 508, 514, 518, and 522 are word nodes, and node 524 is an end node. Such attributes may also indicate text associated with one or more of the word nodes. For instance, nodes 508, 514, 518, and 522 may be respectively associated with the text "I can't," "locate," "that account," and a period ("."). Additionally or alternatively, an attribute of node 522 may indicate that any subsequent text output by NLG module 138 should be capitalized following the output of the period character associated with node 522. The style column of row 596 may indicate that the output generated by the nodes of row 592 is associated with a neutral dialog style.

In an example, NLG module 138 may determine that a response from table 590 is to be output, for instance based on determining that table 590 is associated with node 308 of traversal row 582. Based on determining that a response from table 590 is to be output, NLG module 138 may determine a desired output response style. For instance, based on a determined context of a dialog, NLG module 138 may determine that a response having a formal style is to be output. Based on this style determination, NLG module 138 may query table 590 to request a row having a style column value equal to "formal." Based on this query, row 592 may be returned to NLG module 138. NLG Module 138 may generate and output a response based on row 592.

Alternatively or additionally, a traversal path may be associated with one or more emotion labels, which may comprise a form of filtering condition. Such associated emotion labels may be represented as an additional column of a database table. For example, a given row may be labeled as being associated with "positive," "neutral," "joyful," or "reassuring" emotions. NLG module 138 may select a response corresponding to a traversal row based on such emotion labels.

As another example, NLG module 138 may determine that a response having a neutral style is to be output. Based on this response style determination, NLG module 138 may query table 590 to request a row having a style column value equal to "neutral." Based on this query, row 596 may be returned to NLG module 138, and NLG module 138 may output a response based on row 596.

While the nodes of a traversal and attributes of a node described with respect to FIG. 5C are each described as being encapsulated in a single column for the purpose of example, it should be understood that such nodes and attributes made be represented by more than one column. For example, there may be a corresponding column for each node in a traversal path. There may also be one or more columns for attributes associated with the traversal nodes. Database tables 580 and 590 may take various other forms as well.

Figure 6:
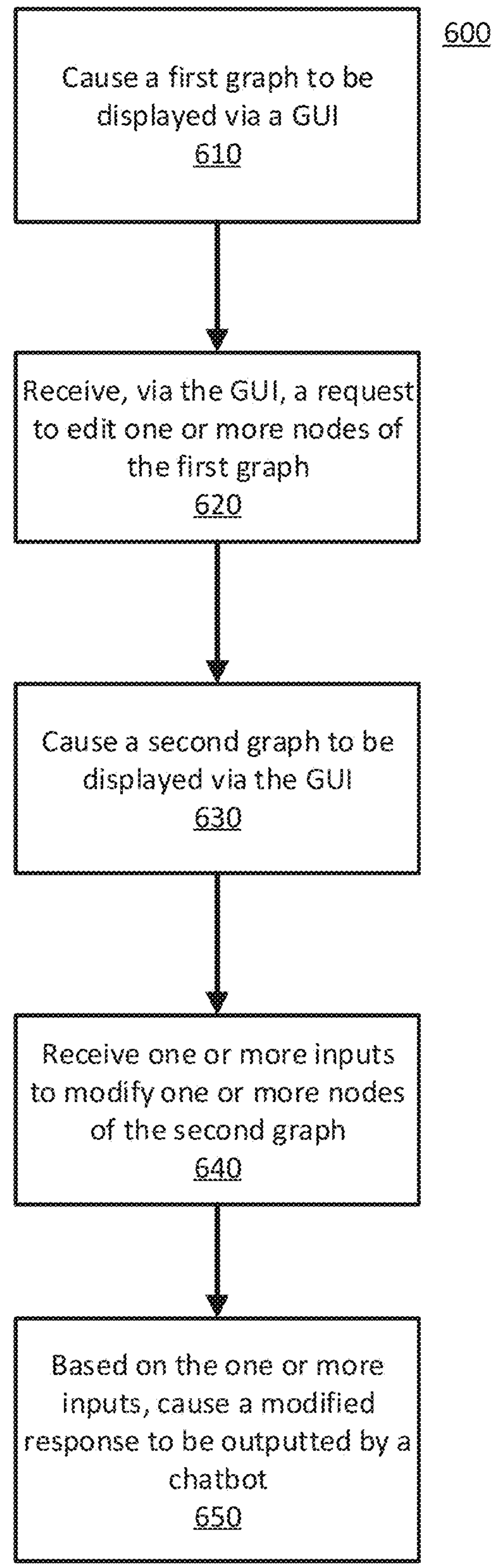
FIG. 6 shows a flow chart of a process for modifying a response graph in accordance with one or more aspects of the disclosure.

As discussed herein, response editor 132 may be configured to output a graph. Response editor 132 may receive one or more user inputs to modify aspects of the graph, such as nodes and/or edges. FIG. 6 shows a flow chart of a process for displaying a graph via a GUI. Some or all of the steps of process 600 may be performed using one or more computing devices as described herein. In a variety of embodiments, some or all of the steps described below may be combined and/or divided into sub-steps as appropriate.

At step 610, a first computing device (e.g., response editor 132 executing on response server 130) may cause a first graph to be displayed on a second computing device, for example, via a graphical user interface (GUI). The second computing device may comprise a client device according to some examples. The first graph may include a plurality of possible interactions with a user device via an automated response system (e.g., a chatbot). For example, the first graph may provide a plurality of paths through an average interaction with respect to a user inquiring about an account balance. In another example, the first graph may provide a plurality of paths through an average interaction for disputing a charge. In yet another example, the first graph may provide a plurality of paths for telling jokes. In this regard, the first graph may comprise a plurality of nodes, including any of the nodes discussed above with respect to FIGS. 3A and 3B. Additionally, the first graph may be selected from a library of graphs, wherein each graph in the library of graphs may be associated with a type of interaction.

At step 620, the first computing device (e.g., the response editor 132 executing on dialog server 130) may receive a request to edit one or more nodes of the first graph. For example, the first and/or second computing device may receive a selection of a first node of the first graph, for example, via the GUI. The selection may be a user input, such as the user selecting a specific node via an input device, such as a keyboard, mouse, touchscreen, etc. Alternatively or additionally, the nodes and edges may be searchable by the computing device, and the computing device may receive a search query for a particular graph and/or node. After returning the search results, the computing device may receive the request to edit one or more nodes. The one or more nodes may comprise any response nodes, including, for example, greetings, requests for information, questions regarding the reason for the inquiry, prompts for additional information, jokes, etc.

At step 630, and based on the selection of the first response node, the second computing device may cause a second graph to be displayed via the GUI. The second graph may be a graph that is associated with a grammar graph node, as an example. The second graph, such as a GG, may comprise word and/or conditional nodes, as just some examples. The generated text may be a first portion of a response to the inquiry received by the chatbot. For example, the inquiry may be a request for an account, and the first portion of the response may be a portion of a response in the form of a grammar graph comprising a plurality of word nodes that indicate that the requested account cannot be located. Alternatively, the inquiry may be a request to dispute a recent transaction, and the first portion of the response may be a prompt requesting more information to identify the transaction that is being disputed. In still another example, the inquiry may be a request for a joke, and the first portion of the response may be the joke.

At step 640, the first computing device may receive one or more inputs to modify the second graph, which may correspond to a first portion of a response to be output. As an example, the first computing device (e.g., response editor 132 executing on dialog server 130) may receive an input to edit a node. The input may comprise an indication to edit properties of the node, such as one or more words associated with the node. The one or more inputs that edit the node may modify or change the words associated with the first portion of the response. Additionally or alternatively, the one or more inputs may rearrange one or more of the nodes of the second graph. For example, the inputs may rearrange nodes of an SMG, CDG, and/or GG, such as word nodes, conditional nodes, GG nodes, and/or other types of nodes, etc. In another example, the one or more inputs may reassign one or more weights associated with one or more edges connecting the nodes of the second graph. In yet another example, the one or more inputs may add additional word nodes to add another response to the first response. The one or more inputs may be drag-and-drop options. That is, the one or more inputs may comprise a user, via the GUI, selecting one or more nodes to add, remove, modify, change, alter, and/or edit by clicking on the node and dragging it to a new location. Additionally, or alternatively, the one or more inputs may comprise a user selecting one or more nodes from a dropdown menu to add to the first portion of the response. The user may then move the node to a desired location and add edges, for example, using any suitable input (e.g., drag-and-drop).

At step 650, the first computing device may train the chatbot based on the one modified one or more nodes of the second graph. As an example, the modified one or more nodes of the second graph may be associated with a database table of output data that may be associated with corresponding input text data. The chatbot may execute a classifier that may be trained to determine associations between input text and database tables and/or database rows corresponding to the one or more modified nodes.

At step 660, based on the one or more inputs, the first computing device may cause a modified response to be a trained output that may be output by the chatbot, for example, in response to the inquiry. For instance, if the trained chatbot receives an inquiry comprising input that the chatbot has been trained to associate with the modified response, the chatbot may cause the modified response to be output in response to the inquiry. The modified response may comprise the first graph, and second graph that may correspond to the modified first portion of the response. The first portion of the response may be represented by response editor 132 as a first graph. The first computing device may convert the first graph to a first database and/or a first database table. The second graph may be stored in a second database and/or a second database table within the same database as the first database table. In some examples, the first and second databases and/or first and second database tables may be linked and/or associated with each other. For example, a database query may return a cell from the first database or first database table, which may cause the computing device to retrieve a second database table that is linked to the cell. The computing device may select a response from the second table. As examples, the response may be selected using a randomization algorithm, round robin approach, and/or based on various filtering criteria. The selected response from the second table may form part of a modified response that is to be output. In order to cause the modified response to be outputted by the chatbot, the computing device may convert the first and second graphs to a format that the chatbot may receive and output. For example, the computing device may convert the first and second graphs into databases and/or database tables as described above.

Figure 7:
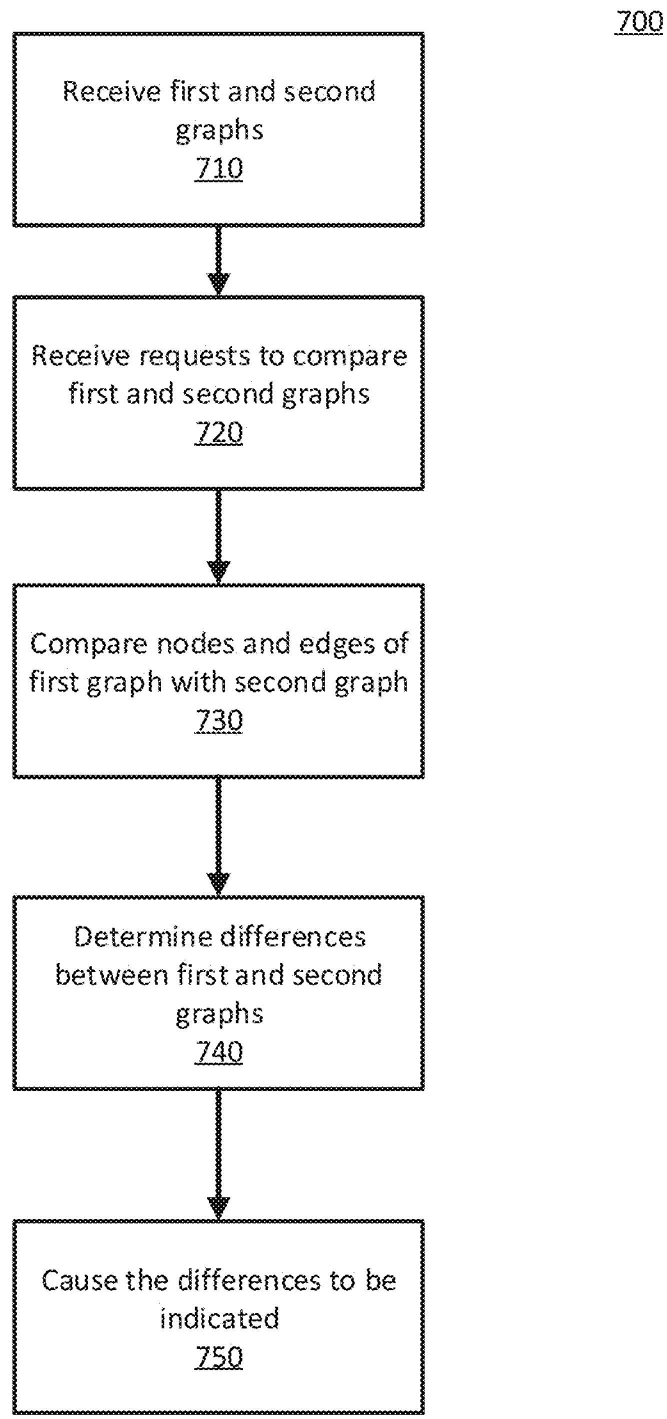
FIG. 7 shows a flow chart of a process for comparing response graphs in accordance with one or more aspects described herein.

As noted above, response editor 132 may allow a user to compare graphs or portions of a graph. FIG. 7 shows an example of a process for comparing two versions of a graph. Process 700 may begin at step 710. At step 710, a computing device may receive a first graph and a second graph. In some examples, the first graph and the second graph may represent the same or similar response (e.g., the same or similar sentence, prompt, inquiry, joke, etc.). The first graph may be a prior version of the response, while the second graph may be a current and/or updated version of the response. Alternatively, the first and second graphs may be portions of the same graph, or may be different graphs entirely.

At step 720, the computing device may receive one or more requests to compare the first and second graphs. As examples, the computing device may receive a request that identifies the first and second graphs via response editor 132, which may display a dialog box that asks the user to specify identifiers of the first and second graphs. Examples of such identifiers may comprise file names, database tables, and/or other identifiers. In some examples, the request may specify a subset of a graph or graphs that are to be compared. For example, the computing device may receive a selection of nodes and/or edges from the first and second graphs that are to be compared to each other.

At step 730, the computing device may compare the nodes and edges of the first and second graphs to each other. Comparing the nodes and edges may involve comparing the UUIDs of the nodes and edges to each other to determine if a node or an edge with a given UUID has been added to, or removed from the second graph. Comparing the nodes and edges may also involve comparing attributes of those nodes and edges, such as probability weights, words associated with word nodes, conditions associated with conditional nodes, starting and ending loop nodes, nodes that are connected by an edge, graphs associated with a particular node, and/or various other attributes as well.

At step 740 and based on the comparison of the nodes and edges of the first and second graphs, the computing device may determine differences, such as changes, modifications, and/or alterations between the first and second graphs. The changes, modifications, and/or alterations may include identifying data that has been modified, added to, or removed from the second graph. Such data that may be modified, added to, or removed from the second graph may include nodes or edges.

At step 750, the computing device may cause the determined differences to be indicated, for example via response editor 132. Such differences may be indicated by highlighting, emphasis, and/or other indications, as just some examples. The differences may be output for display at a computing device.

Figure 8:
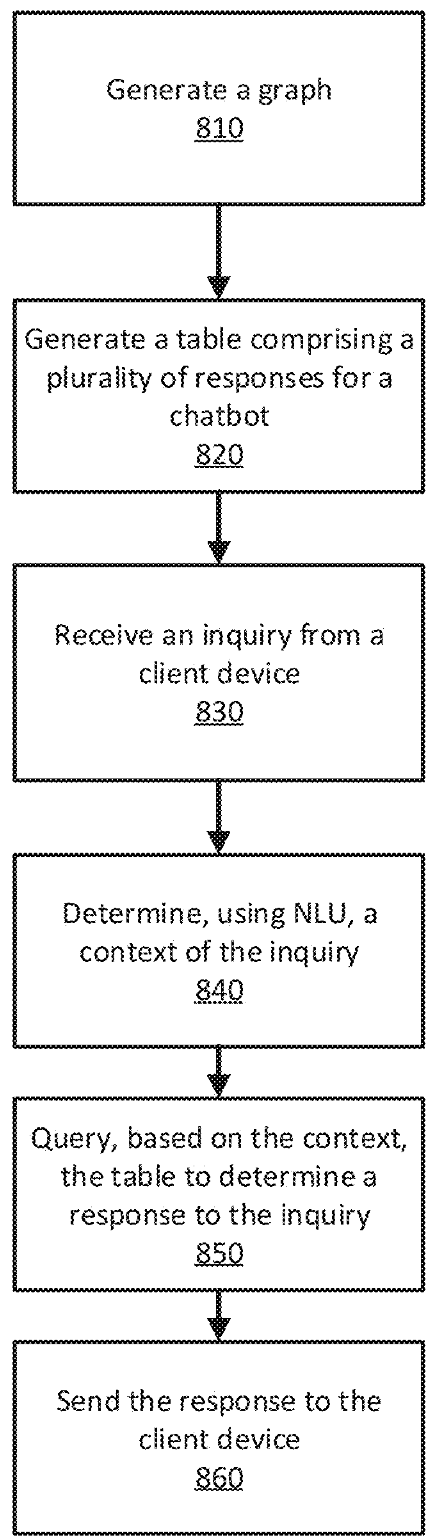
FIG. 8 shows a flow chart of a process for generating chatbot responses in accordance with one or more aspects of the disclosure.

As discussed above, a computing device may perform a database query to access a response graph represented in the form of a database. FIG. 8 illustrates an example flow chart for representing a graph in the form of a database table and querying the table in accordance with one or more aspects of this disclosure. In a variety of embodiments, some or all of the steps described below may be combined and/or divided into sub-steps as appropriate.

Process 800 may begin at step 810. At step 810, a computing device may generate a first graph. The first graph may be generated using the techniques described above. Such a graph may be generated, for example, via response editor 132. A user may provide inputs to place nodes within a GUI. The user may also provide one or more inputs to create edges within the GUI. Each edge may be represented as an arrow that has a head and a tail. A user may provide one or more inputs to connect the head to one node and the tail to a different node. The user may also reattach the head and/or tail of an edge to a different node or nodes. The user may also assign various properties to one or more nodes and/or edges via response editor 132, such as probability weights, conditions, loop conditions, and/or other properties, as described herein.

At step 820, the computing device (e.g., NLG module 138 executing on dialog server 130) may generate a table comprising a plurality of responses for an automated response system, such as an AVR or chatbot. The computing device may generate the table based on the response graph. As an example, the computing device may generate a table corresponding to the response graph, in which each row corresponds to a different traversal path through the first graph. Within a given row, one or more columns of a given table may contain a sequence of nodes that corresponds to the traversal path of that row. One or more columns within a given row may also represent various attributes such as: filters/selectors, such as conditions, styles, emotion labels, weights, etc., that may be associated with one or more nodes in a traversal path. A given cell that represents a node of a first graph may be linked to a second database and/or a second database table that represents a second graph, as described above. The process of generating a graph in step 810 may also involve linking a cell of the first graph to a second graph represented by a second database or a second database table. In some examples, the computing device may generate the second database table or second database based on the cell of the first table being associated with the second graph.

At step 830, the computing device (e.g., NLU module 134 executing on dialog server 130) may receive an inquiry from a client device, such as client device 110 or 120. The client device may receive an inquiry based on user input from a user, and may provide the received user input to the computing device. As one example, the inquiry may involve a user asking for a user's bank account balance.

At step 840, the computing device (e.g., NLU module 134 executing on dialog server 130) may determine, using NLU, a context of the inquiry. Determining the context of the inquiry may further involve NLG module 138 determining a graph that is associated with the inquiry, such as a graph that outputs a user's bank balances. Determining the context of the inquiry may also involve determining the current state of a dialog, such as whether the user has multiple bank accounts, and/or whether the user has been successfully authenticated to receive the requested bank account balances.

At step 850, the computing device may query the table based on the determined context to determine a response to the inquiry. Such a table may correspond to a CDG according to some examples. To query the table, NLG module 138 may determine a table corresponding to the user's inquiry based on the determined context. NLG module 138 may query the table based on the determined context to determine a response to the user's inquiry. Querying the table may cause a response to be returned from a database. Depending on the structure of the returned database response, for instance if a CDG comprises multiple GGs, NLG module 138 may query the database again to determine a corresponding response for each GG.

As an example, NLG module 138 may determine that the user is authenticated to access the requested bank account balance information, and that the user has multiple bank accounts. Based on this determined context, NLG module 138 may identify a database table, and query the identified table to determine a response, which may correspond to a traversal path of a corresponding graph. Based on the determined response from the database, NLG module 138 may output a response to the user's inquiry.

At step 860, the computing device may cause the chatbot to output the response, which may involve sending the response to the client device. The computing device may send the response to the client device via interprocess communication, network communications, messaging systems, and/or various other manners. In some instances, the process of sending a response to the client device may be iterative. For example, the computing device may send a response to the client device until a user requests that the chatbot (e.g., executing on dialog server 130) ceases output, or until a certain condition has been met.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML, or XML. The computer-executable instructions may be stored on a computer-readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

What is claimed is:

1. A method comprising:

causing, by a computing device, a first graph to be displayed via a graphical user interface (GUI), wherein:
- the first graph comprises one or more response nodes,
- the first graph indicates a structure of a response,
- each response node, of the one or more response nodes, indicates a portion of a possible response to an inquiry to be received by a trained chatbot;

receiving, via the GUI, a selection of a first response node;

causing, based on the selection of the first response node, a second graph to be displayed via the GUI, wherein:
- the second graph comprises a first portion of the response to the inquiry;
- the first portion of the response comprises a plurality of words, wherein the plurality of words is represented by at least one word node in the second graph;

receiving one or more inputs to modify the first portion of the response, resulting in a modified first portion of the response, wherein the one or more inputs comprises a selection of one or more word nodes of the second graph, and wherein the modified first portion of the response corresponds to a modified version of the second graph;

determining one or more differences between the second graph and the modified version of the second graph;

causing the one or more differences to be displayed; and causing, based on the one or more inputs, the modified first portion of the response to be a trained output by the chatbot, when deployed, in response to receiving the inquiry.

2. The method of claim 1, further comprising: causing, based on the selection of the first response node, a route overlay to be displayed on the second graph, wherein the route overlay indicates each word node that is used to generate the first portion of the response.

3. The method of claim 1, further comprising: generating, based on the first graph, a table comprising a plurality of responses for the chatbot; receiving, via the chatbot, a second inquiry; querying, based on the second inquiry, the table to determine a second response to the second inquiry; and causing the second response to be outputted by the chatbot.

4. The method of claim 3, further comprising: determining, using natural language processing, a context of the second inquiry prior to querying the table.

5. The method of claim 1, wherein the first graph comprises a content determination graph.

6. The method of claim 1, wherein the second graph comprises a grammar graph.

7. The method of claim 1, wherein the receiving one or more inputs to modify the first portion of the response comprises: receiving a selection of a path of the second graph; and generating, based on receiving the selection, a preview of a first portion of the response.

8. The method of claim 1, wherein a node of the first graph is associated with the second graph.

9. The method of claim 1, wherein the second graph comprises one or more variable nodes, wherein a first variable node of the one or more variable nodes causes additional information to be inserted into the response.

10. A computing device comprising:
one or more processors; and
memory storing instructions that, when executed by the one or more processors, cause the computing device to:
cause a first graph to be displayed via a graphical user interface (GUI), wherein:
the first graph comprises one or more response nodes,
the first graph indicates a structure of the response, and
each response node, of the one or more response nodes, indicates at least a portion of a possible response to an inquiry to be received by a trained chatbot;
receive, via the GUI, a selection of a first response node;
based on the selection of the first response node:
cause a second graph to be displayed via the GUI, wherein:
the second graph comprises a first portion of the response to the inquiry received by the chatbot; and
the first portion of the response comprises a plurality of words, wherein the plurality of words are represented by at least one word node in the second graph;
cause a route overlay to be displayed on the second graph, wherein the route overlay indicates each word node that is used to generate the portion of the response;
receive one or more inputs to modify the first portion of the response, resulting in a modified first portion of the response, wherein the one or more inputs comprises a selection of one or more word nodes of the second graph, and wherein the modified first portion of the response corresponds to a modified version of the second graph;
determine one or more differences between the second graph and the modified version of the second graph;
cause the one or more differences to be displayed; and
cause, based on the one or more inputs, the modified first portion of the response to be a trained output by the chatbot, when deployed, in response to receiving the inquiry.

11. The computing device of claim 10, wherein the instructions, when executed by the one or more processors, cause the computing device to:
generate, based on the first graph, a table comprising a plurality of responses for the chatbot;
receive, via the chatbot, a second inquiry;
determine, using natural language processing, a context of the second inquiry;
query, based on the context, the table to determine a second response to the second inquiry; and
cause the second response to be outputted by the chatbot.

12. The computing device of claim 10, wherein the instructions, when executed by the one or more processors, cause the computing device to:
receive a selection of a path of the second graph; and
generate, based on receiving the selection, a preview of the portion of the response.

13. The computing device of claim 10, wherein the instructions, when executed by the one or more processors, cause the computing device to:
receive a selection of a path of the first graph; and
generate, based on receiving the selection, a preview of the response.

14. The computing device of claim 10, wherein:
the first graph further comprises one or more conditional nodes;
a first conditional node of the one or more conditional nodes is associated with a value of a variable; and
the response is outputted based on the value of the variable.

15. A non-transitory computer readable medium comprising instructions, that when executed by one or more processors, cause a computing device to:
cause, for display via a graphical user interface (GUI), a first graph wherein:
the first graph comprises one or more response nodes, and
each response node, of the one or more response nodes, comprises a possible response to an inquiry to be received by a trained chatbot;
receive, via the GUI, a selection of a first response node;
based on the selection of the first response node:
cause a second graph to be displayed via the GUI, wherein:
the second graph comprises a portion of the response to the inquiry expected to be received by the chatbot; and
the response comprises a plurality of words, wherein the plurality of words is represented by at least one word node in the second graph;
cause a route overlay to be displayed on the second graph, wherein the route overlay indicates each word node that is used to generate the portion of the response;

receive one or more inputs to modify the portion of the response, resulting in a modified first portion of the response, wherein the one or more inputs comprises a selection of one or more word nodes of the second graph, and wherein the modified first portion of the response corresponds to a modified version of the second graph;

determine one or more differences between the second graph and the modified version of the second graph;

cause the one or more differences to be displayed;

determine, using natural language processing, a context of the inquiry received via the chatbot;

determine, based on the context of the inquiry, a state management graph (SMG); and cause a response, defined by the SMG and the modified portion of the response, to be a trained output by the chatbot when deployed.

16. The non-transitory computer readable medium of claim 15, wherein the instructions, when executed by the one or more processors, cause the computing device to:

generate, based on the first graph, a table comprising a plurality of responses for the chatbot;

receive, via the chatbot, a second inquiry;

determine, using the natural language processing, a second context of the second inquiry;

query, based on the second context, the table to determine a second response to the second inquiry; and cause the second response to be outputted by the chatbot.

17. The non-transitory computer readable medium of claim 15, wherein the second graph comprises a grammar graph.

18. The non-transitory computer readable medium of claim 15, wherein the instructions, when executed by the one or more processors, cause the computing device to:

receive a selection of a path of the second graph; and generate, based on receiving the selection, a preview of the portion of the response.

19. The non-transitory computer readable medium of claim 15, wherein a node of the first graph is associated with the second graph.

20. The non-transitory computer readable medium of claim 15, wherein the second graph comprises one or more variable nodes, wherein a first variable node of the one or more variable nodes causes additional information to be inserted into the response.

* * * * *